April 2, 1963     L. D. LONG     3,083,434
APPARATUS FOR MAKING PRE-CAST CORED BUILDING BLOCKS
Filed Nov. 17, 1959     11 Sheets-Sheet 1

Fig. 1.

INVENTOR.
LEONARD D. LONG,
BY
Schley, Trask & Jenkins
ATTORNEYS.

April 2, 1963 L. D. LONG 3,083,434
APPARATUS FOR MAKING PRE-CAST CORED BUILDING BLOCKS
Filed Nov. 17, 1959 11 Sheets-Sheet 2

INVENTOR.
LEONARD D. LONG,
BY
Schley, Trask & Jenkins
ATTORNEYS.

INVENTOR.
LEONARD D. LONG,
BY
ATTORNEYS.

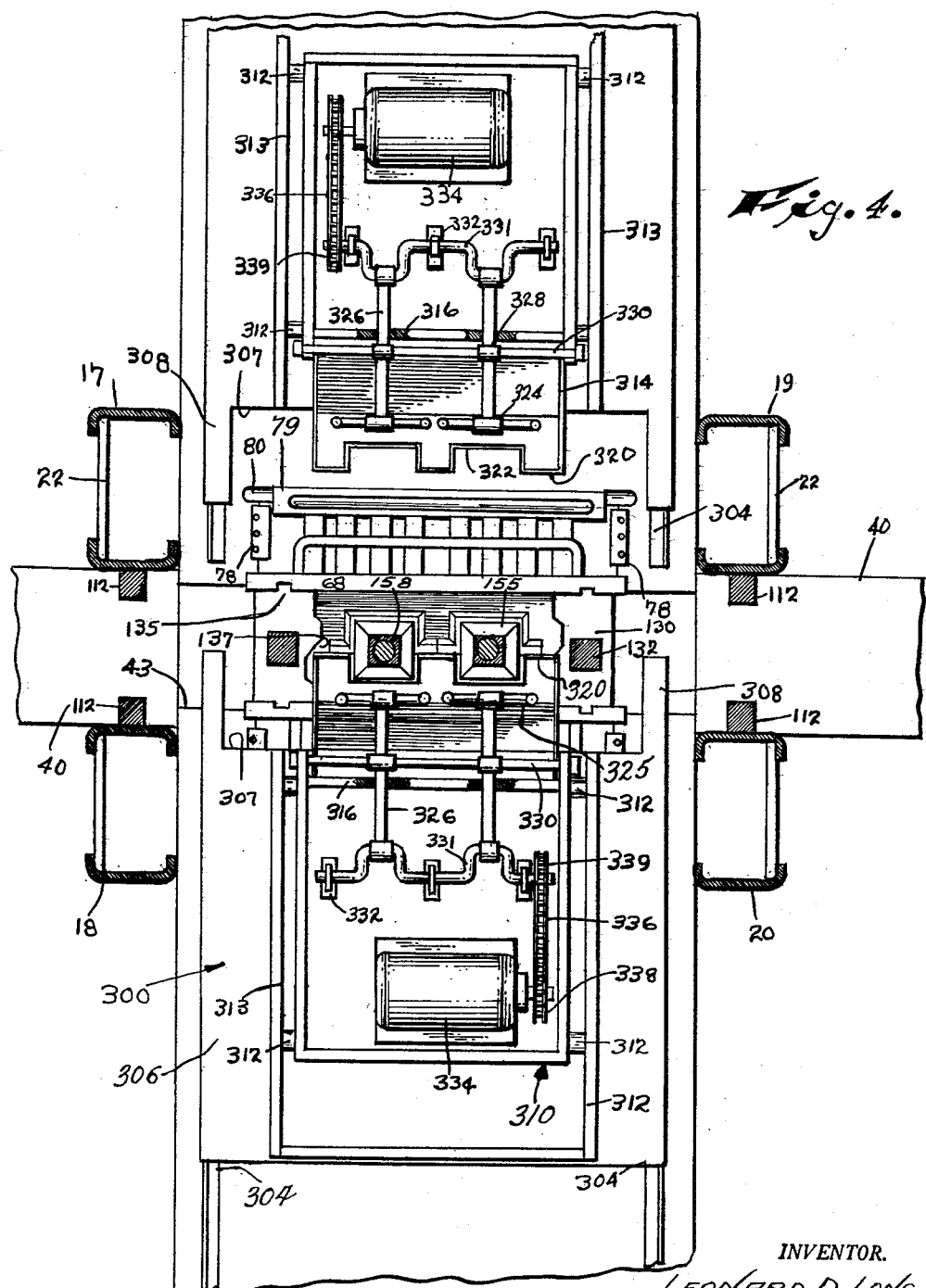

April 2, 1963 L. D. LONG 3,083,434
APPARATUS FOR MAKING PRE-CAST CORED BUILDING BLOCKS
Filed Nov. 17, 1959 11 Sheets-Sheet 5

INVENTOR.
LEONARD D. LONG,
BY
Schley, Trask & Jenkins
ATTORNEYS.

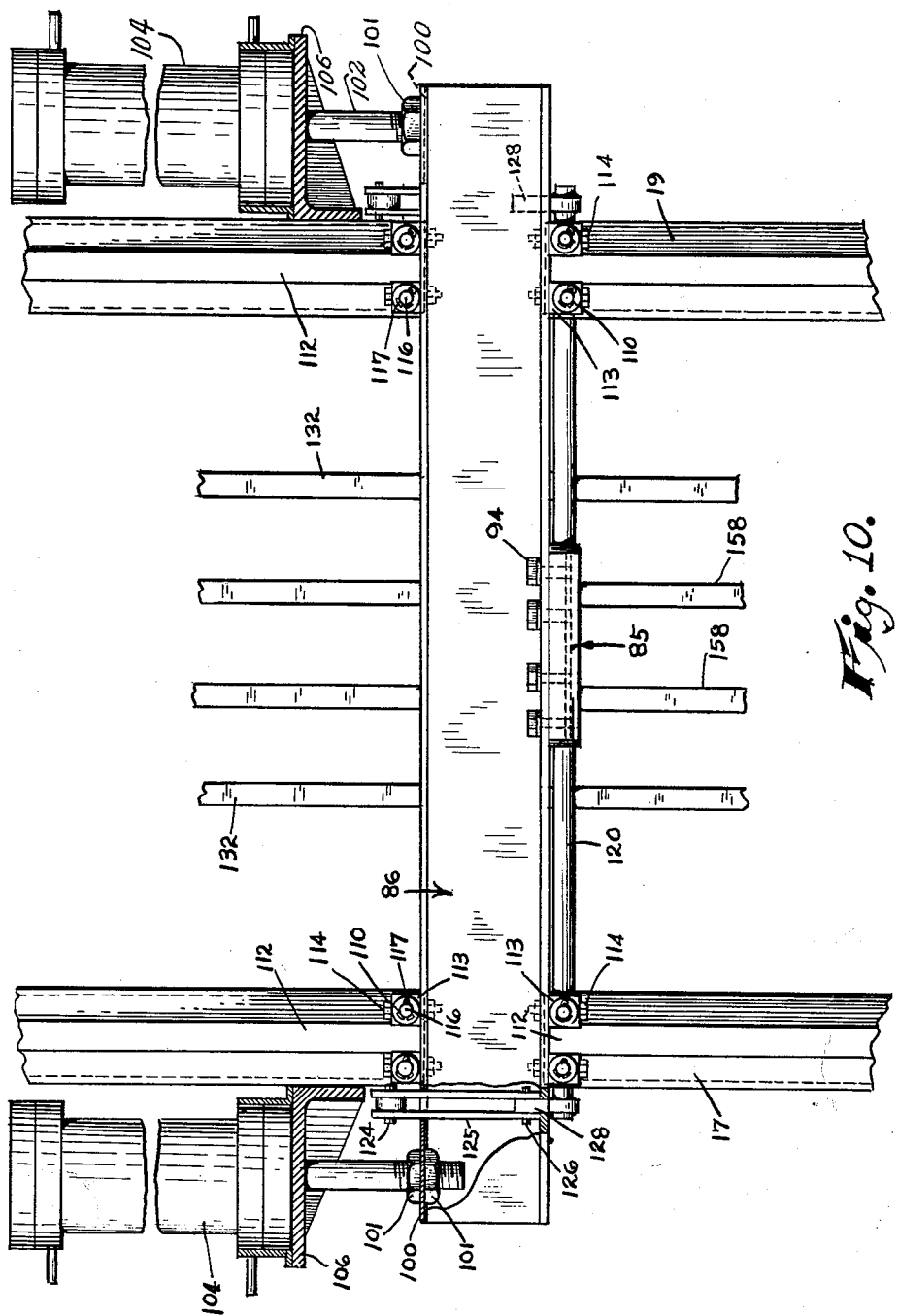

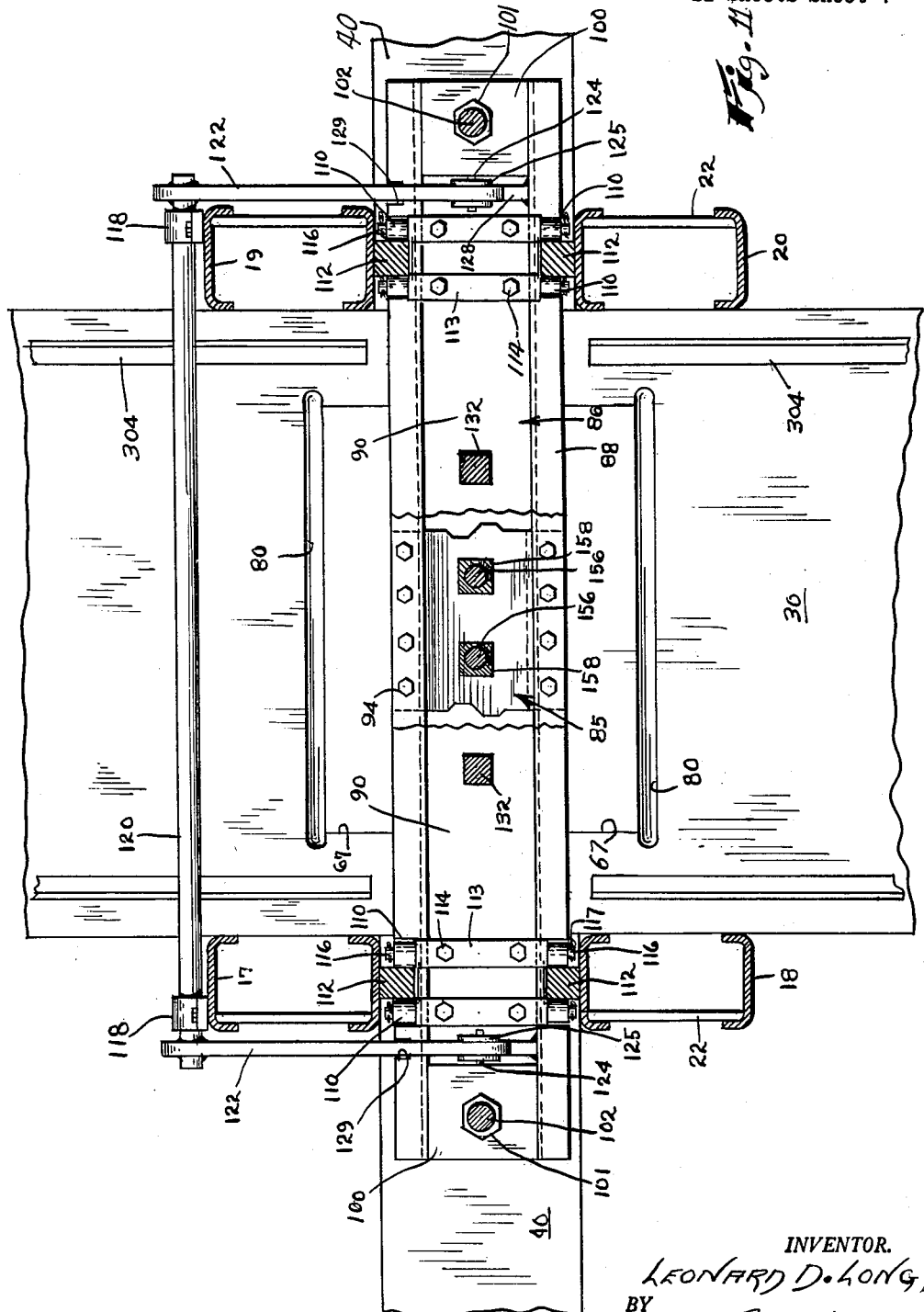

April 2, 1963 L. D. LONG 3,083,434
APPARATUS FOR MAKING PRE-CAST CORED BUILDING BLOCKS
Filed Nov. 17, 1959 11 Sheets-Sheet 8

INVENTOR.
LEONARD D. LONG,
BY
Schley, Trask & Jenkins
ATTORNEYS.

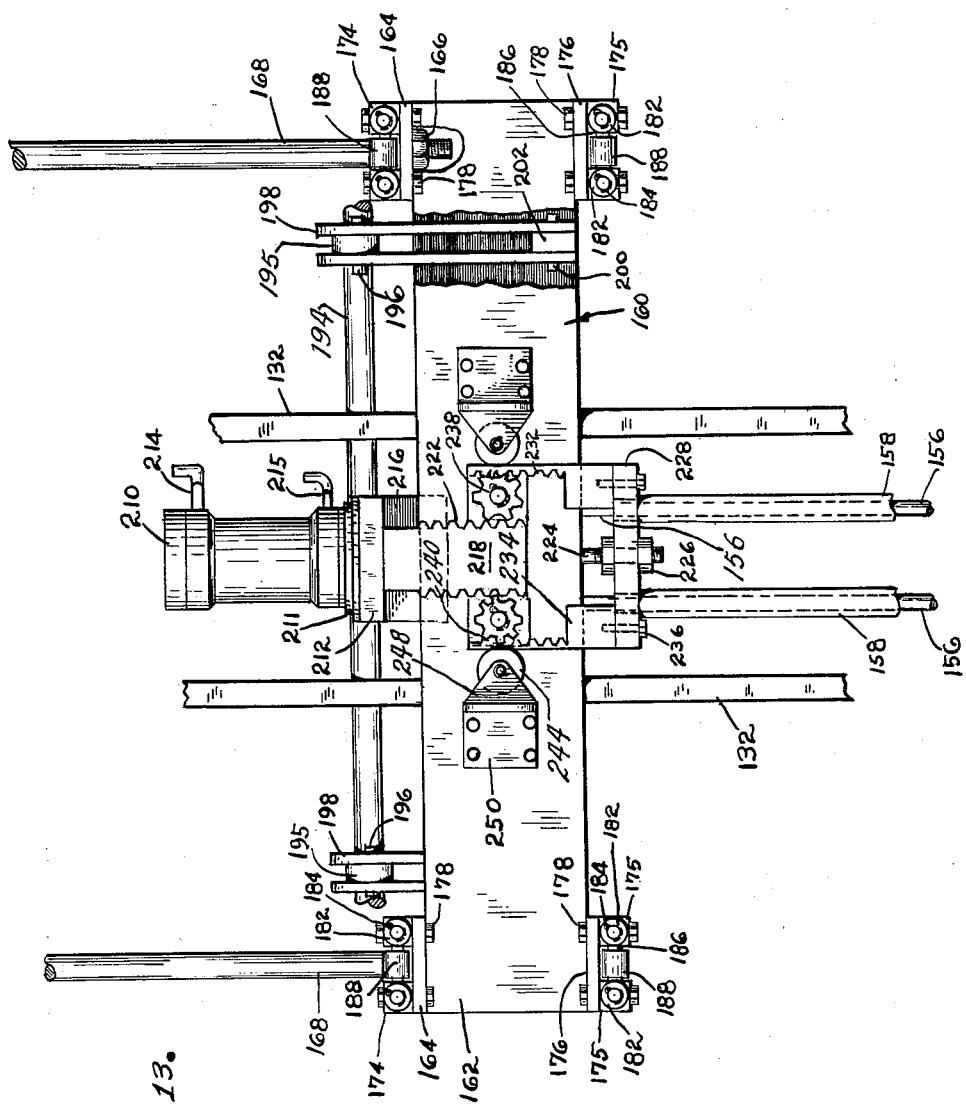

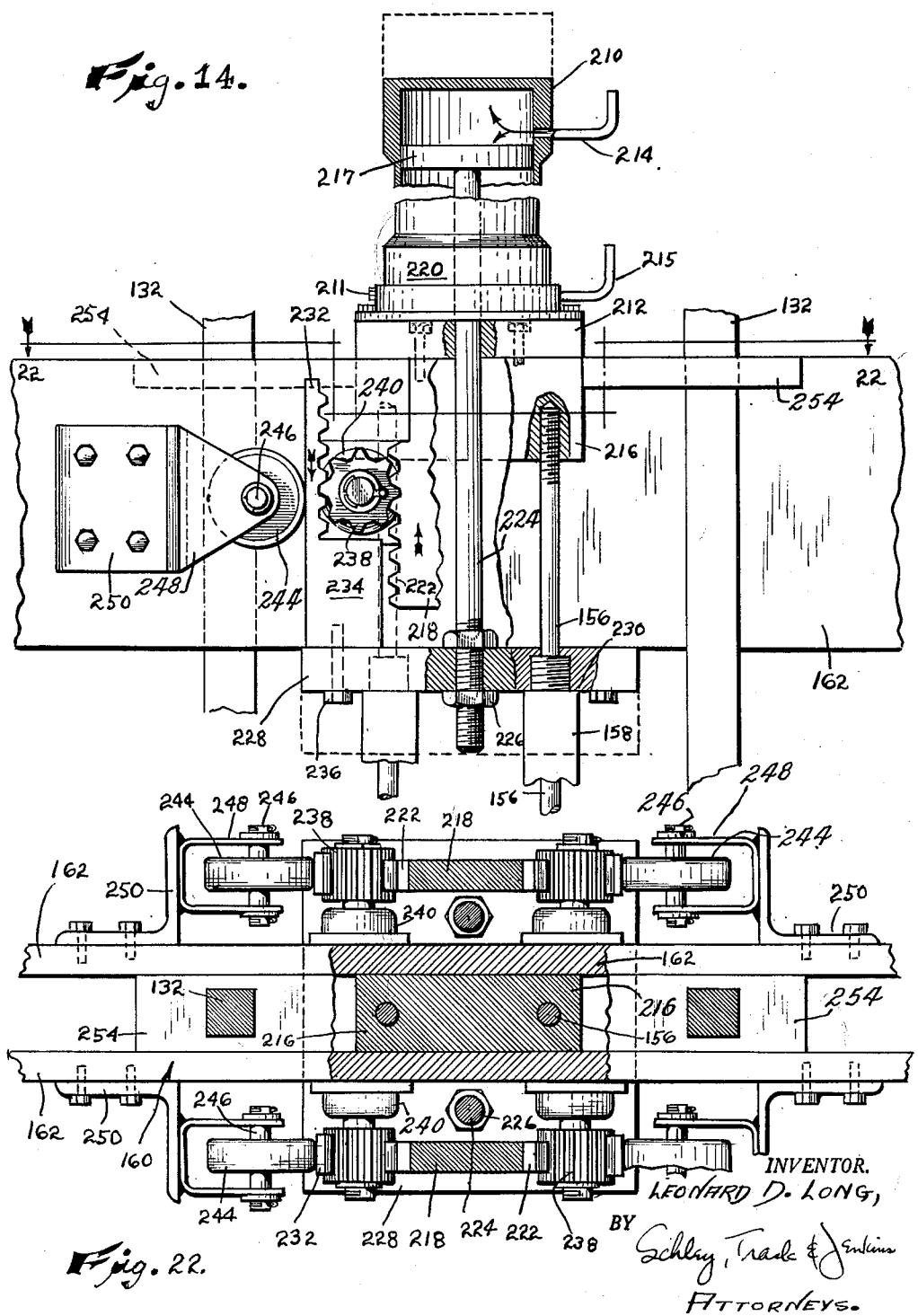

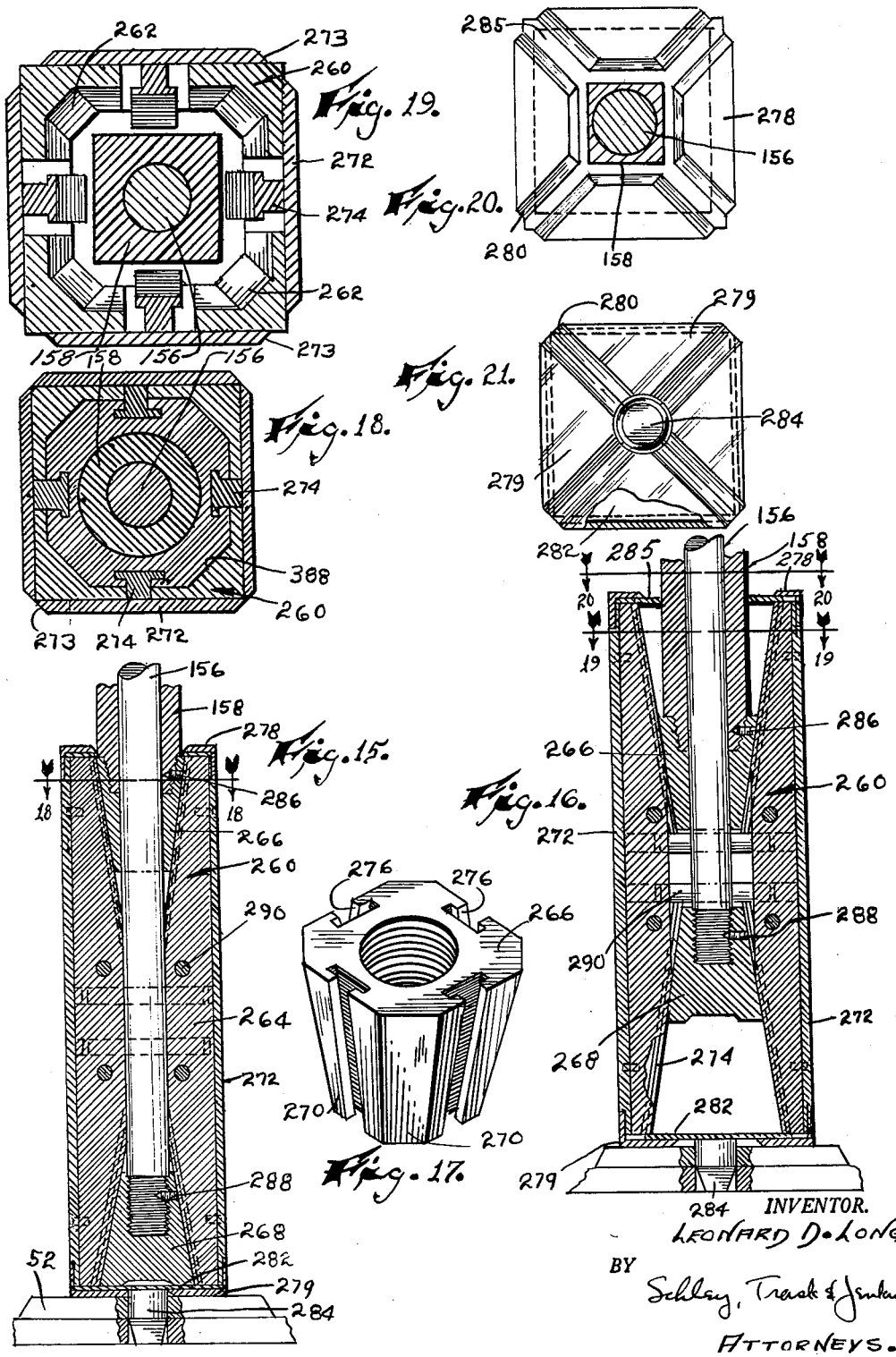

United States Patent Office 3,083,434
Patented Apr. 2, 1963

3,083,434
APPARATUS FOR MAKING PRE-CAST CORED BUILDING BLOCKS
Leonard D. Long, P.O. Box 288, 2110 Mount Pleasant St., Charleston, S.C.
Filed Nov. 17, 1959, Ser. No. 853,476
5 Claims. (Cl. 25—45)

This invention relates to an apparatus for producing pre-cast cored building blocks, and more particularly to an apparatus for producing cementitious pre-cast building blocks of the type generally referred to as concrete or cinder blocks.

In producing concrete blocks, it has heretofore been the practice to employ machines having molds with fixed sidewalls and fixed dimensional core-forming elements. In such machines, the mold components forming the outer faces of the finished blocks, except for the component forming the top face of the block, and the core-forming elements are disposed in operative position; the mold is filled with aggregate; and the mold component forming the top face of the block is then placed in position. The aggregate is then allowed to set up into a self-supporting condition and the partially cured block is then withdrawn from the mold. Blocks formed in molds of this type generally have a relatively low density due to the entrained air in the aggregate forming the block, and generally have relatively wide variations in their external dimensions. In an effort to increase the density of such blocks, it has been proposed to form such blocks in a mold having sidewalls which are movable to compress the aggregate within the mold before it has set up. An apparatus and method for carrying out this type of operation are described in my Patent No. 2,624,928, issued January 13, 1953. However, in producing pre-cast blocks in such an apparatus it is difficult to produce blocks having precise, fixed, outer dimensions. This lack of uniformity in the outer dimensions of the blocks produces a corresponding lack of uniformity in walls formed from such blocks. Adjusting the amount of mortar between the ends of adjacent blocks tends to overcome the deficiencies in the nonuniformity of the lengths of such blocks, but where no mortar is used between ends of adjacent blocks, their lack of uniformity will consequently produce walls of nonuniform length. Nor will the use of mortar compensate for the differences in the widths of the blocks. Further, this lack of outer dimensional uniformity of the blocks increases the difficulty in keying the blocks together as they are laid up.

While I am aware that it has been proposed in the production of field tile and other such articles having cores formed therein to employ expandable and collapsible core-forming elements, such core-forming elements are generally adapted to be expanded before the aggregate is placed in the mold. That is, such elements are merely adapted to form a hollow core in the article being produced, and after forming such cores are retracted or collapsed to permit their withdrawal from the formed element. They are not adapted to expand to form the compression forces necessary to compress a mass of aggregate into a high density, pre-cast element substantially void of any network of entrained air cells. Nor are they adapted to be used in an apparatus for producing an article having a high degree of uniformity in its outer dimensions.

It is an object of my invention to provide an apparatus for making pre-cast building blocks which will be adapted to produce such blocks over a wide range of sizes, which will produce such blocks having the desired patterns and contours formed in their outer faces, which will produce relatively high density blocks, and which will produce blocks having a high degree of uniformity in their outer dimensions within the size range of blocks being produced.

It is a further object of my invention to provide an apparatus for producing precast building blocks in quantity and whose operational sequence for producing such blocks will require a minimum of time.

In carrying out my invention in its preferred form, I provide an apparatus comprising a frame adapted to support a worktable thereon. Disposed on said worktable is a mold for forming precast building blocks and including a bottom palette adapted to be retained on the worktable in a fixed position during the molding cycle. A pair of sidewall-forming members are mounted on opposed sides of the bottom palette, and the top of the mold is formed by a top palette movable from a retracted position disposed well above the mold to an operative position in which it is interlockingly received on the upper ends of the sidewall-forming members. The top palette is carried on a beam movable vertically along the supporting frame by a power source mounted on said frame. Conveniently, the top and bottom palettes may be provided with corresponding keys and keyways for forming tongue and groove patterns on the upper and lower faces of the blocks being produced.

The ends of the mold cavity are closed by a pair of end-formers vertically movable with respect to the mold between a retracted position in which they are disposed above the mold and an operative position in which they are disposed on the bottom palette between the sidewall-forming members to close the ends of the mold.

A second beam also carried from the supporting frame is vertically movable with respect to the mold and carries a plurality of expandable core-formers adapted to form the cores in blocks being produced. Each of said core-formers is carried on a pair of vertically extending shafts which extend through the top palette for connection to said second beam. The core-formers are movable between collapsed and extended positions by a pair of wedges engageable with a plurality of core segments having inwardly disposed thrust-receiving faces engageable with the thrust faces of the wedges, so that upon movement of the wedges with respect to each other in one direction the core segments will be moved in spaced relation for expanding the core-former; and upon relative movement of the wedges in an opposite direction, the core segments will be moved into their collapsed position to effect collapse of the core-former. Conveniently, a plurality of face plates are mounted on the core segments to bridge the spaces between adjacent core segments to prevent the entry of aggregate into the core-former when it is in expanded position.

To effect such relative movement of the pairs of wedges in the core-formers each pair of said wedges is connected to one of said pairs of shafts carrying the core-formers. The opposite ends of the shafts are connected to means mounted on said second beam for moving the shafts in each pair of shafts relative to each other to impart a like relative movement to the pair of wedges in each core-former for expanding and collapsing the core-former. Conveniently, the means for imparting the relative movement to each of the pairs of shafts is provided with means for supporting it on said second beam and synchronizing the relative movements of the shafts.

The aggregate used in forming the blocks is carried in a pair of hoppers supported in the worktable on either side of the mold cavity. The hoppers are movable on said worktable between a retracted position and an operative position in which they overlie the mold cavity for discharging the aggregate into said cavity.

Other embodiments and features of my invention will become more apparent from the detailed description which follows and from the accompanying drawings, in which:

FIG. 1 is a side elevation of a block-forming apparatus embodying my invention;

FIG. 4 is a horizontal section taken on the line 4—4 of FIG. 1, but showing the end and core-formers and one of the aggregate hoppers in operative position;

FIG. 10 is a fragmentary vertical section showing the top palette beam assembly;

FIG. 11 is a horizontal section taken on the line 11—11 of FIG. 2, but with the mold removed therefrom;

FIG. 13 is a fragmentary vertical section showing the core-former beam assembly;

FIG. 14 is an enlarged fragmentary side view of the core-former actuating mechanism, with portions thereof broken away;

FIG. 15 is a vertical section of one of the expandable core-formers;

FIG. 16 is a vertical section of the core-former shown in FIG. 15, but showing said core-former in expanded position;

FIG. 17 is an isometric view of the upper wedge of the core-former shown in FIG. 15;

FIG. 18 is a horizontal section taken on the line 18—18 of FIG. 15;

FIG. 19 is a horizontal section taken on the line 19—19 of FIG. 16;

FIG. 20 is a horizontal section taken on the line 20—20 of FIG. 16;

FIG. 21 is a bottom plan view of the core-former shown in FIG. 15; and

FIG. 22 is a horizontal section taken on the line 22—22 of FIG. 14.

My invention is adapted to produce pre-cast concrete blocks having a high density and an extremely high degree of external dimensional uniformity. For example, concrete blocks produced in my apparatus have tolerances of less than 1/64 of an inch on blocks of eight-foot lengths. By making blocks with such a high dimensional uniformity, I am able to lay up walls with precise lengths and thicknesses. I am further able to lay up such walls without the use of mortar between the adjacent ends and faces of adjacent blocks, and may employ keys and keyways on the outer block faces so that the blocks are laid up in an interlocking relationship.

The small tolerances in the outer dimensions of my blocks makes it possible to lay up a wall of such blocks about four or five feet high without the use of mortar, the mating keys and keyways in adjacent blocks locking them together. In laying the blocks the cores will be disposed in vertical alignment so that concrete may be poured down the columns formed by the aligned cores of the blocks to form a truly rigid structure. Due to the interlocking relationship between the blocks, it is necessary to pour such concrete columns down the aligned cores at only every fifth or sixth core column, and such columns need not be poured until a wall of blocks four or five feet high has been laid.

Figure 8:
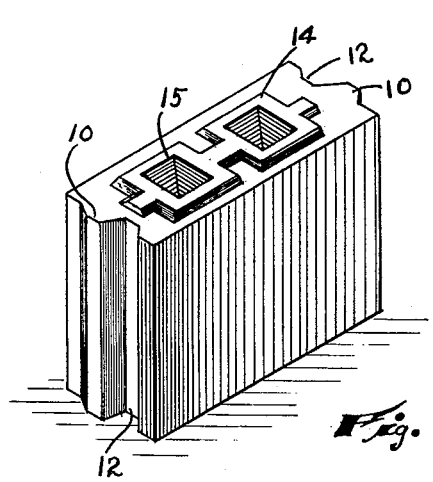
FIG. 8 is an isometric view of a block formed in the apparatus shown in FIG. 1.
Figure 9:
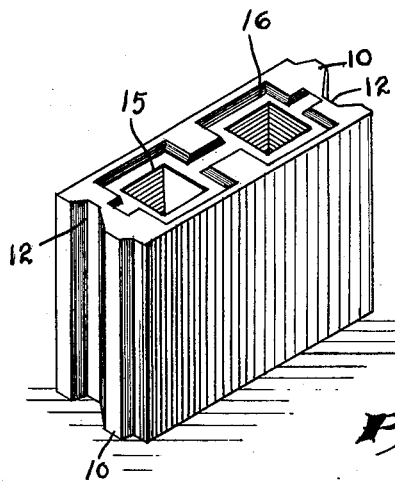
FIG. 9 is an isometric view of the block shown in FIG. 8, but showing said block resting on its opposed face.

As shown in FIGS. 8 and 9, such a block may be provided with a vertically extending key 10 and keyway 12 at each of its ends, and with mating keys 14 and keyways 16 on its top and bottom faces bordering the spaced cores 15 extending through the block. Further, the blocks produced in my apparatus have an extremely high density with substantially no internally entrained air networks. This permits an extremely strong block to be produced. It permits the production of blocks having a height at least twelve inches, as compared to the conventional eight-inch height of blocks formed in machines previously available.

As illustrated, my apparatus for producing such blocks comprises a supporting frame conveniently formed from spaced, vertically extending pairs of channel beams 17, 18, 19, and 20. Each of the pairs of beams is interconnected and cross-braced by a plurality of braces 22 rigidly connected thereto as by welding. The upper ends of the pairs of vertically extending frame elements 17 and 18, and 19 and 20 are interconnected and cross-braced by steel channels 34 rigidly connected thereto as by welding, and similarly the lower ends of said frame members are cross-braced by transversely extending braces 36 rigidly connected to said frame members by welding.

Figure 3:
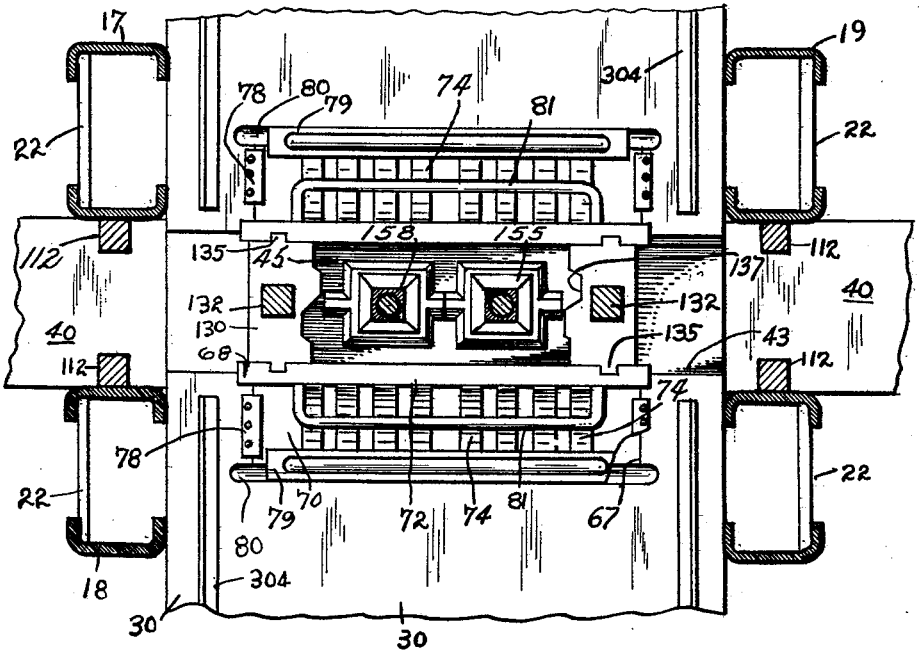
FIG. 3 is a horizontal section taken on the line 3—3 of FIG. 2, but showing the end and core-formers in operative position.

A horizontally disposed worktable 30 is interposed between, and connected to, frame members 17–20 substantially above the lower ends of said frame members. The worktable extends outwardly beyond the extent of said frame members and is supported at its ends on a plurality of ground-engaging legs 28. Extending outwardly from the opposed sides of the worktable between the pairs of frame elements are shelves 40 supported at their outer ends as by braces 42 connected to said frame elements. As illustrated in FIG. 3, the worktable 30 is provided with a transversely extending groove 43. The groove 43 extends outwardly to the edges of said worktable and is coplanar with the upper faces of the shelves 40.

The bottom face of the block mold is formed by a bottom palette 45 slidable in the worktable groove 43 and provided with a plurality of openings 46 and 48 adapted to be disposed in alignment with a corresponding set of openings formed in the groove 43 and extending through the worktable 30. Conveniently, in order to produce the keyways 16 in the bottom faces of the blocks, the openings 48 in the bottom palette 45 are bordered by patterned projections 52 having centrally disposed openings 49 in alignment with palette openings 48 and provided with beveled edges 53. The bottom palette 45 is provided with additional openings 55 adjacent its ends for the reception of hooks or other elements for conveniently sliding the palette along the worktable groove 43. Alternatively, the palette 45 may be slid into and out of operative position on the worktable by any suitable power means mounted on the worktable 30 or one of the worktable shelves 40.

Figure 7:
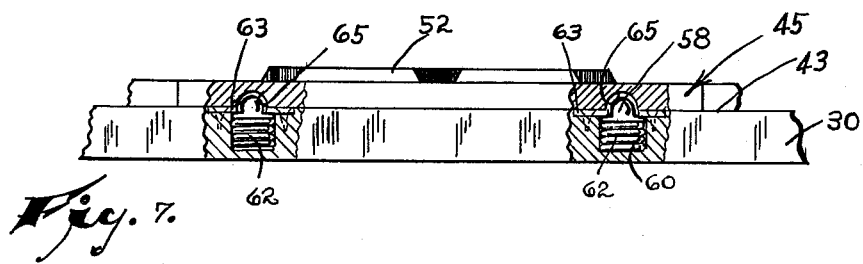
FIG. 7 is a fragmentary side view of the bottom palette and worktable with portions thereof broken away to show the palette locator pins.

Desirably, in order to locate the bottom palette in operative position on the worktable 30 a plurality of locator pins are disposed in the upper face of the groove 43. As shown in FIG. 7, each of the locator pins comprises a button 58 received in a shouldered opening 60 formed in the worktable 30 and spring biased above the plane of the worktable groove 43 by a coil spring 62. The button 58 and the spring 62 are held in the opening 60 by an annular collar 63 mounted in the shouldered upper end of the opening 60 and extending inwardly from the edges thereof to engage the marginal flange on the button 58 to hold it in the opening 60. Recesses 65 are formed in the lower face of the bottom palette 45 in which the upwardly projecting buttons 58 may seat to locate the palette in an operative position as it is slid along the groove 43.

Figure 6:
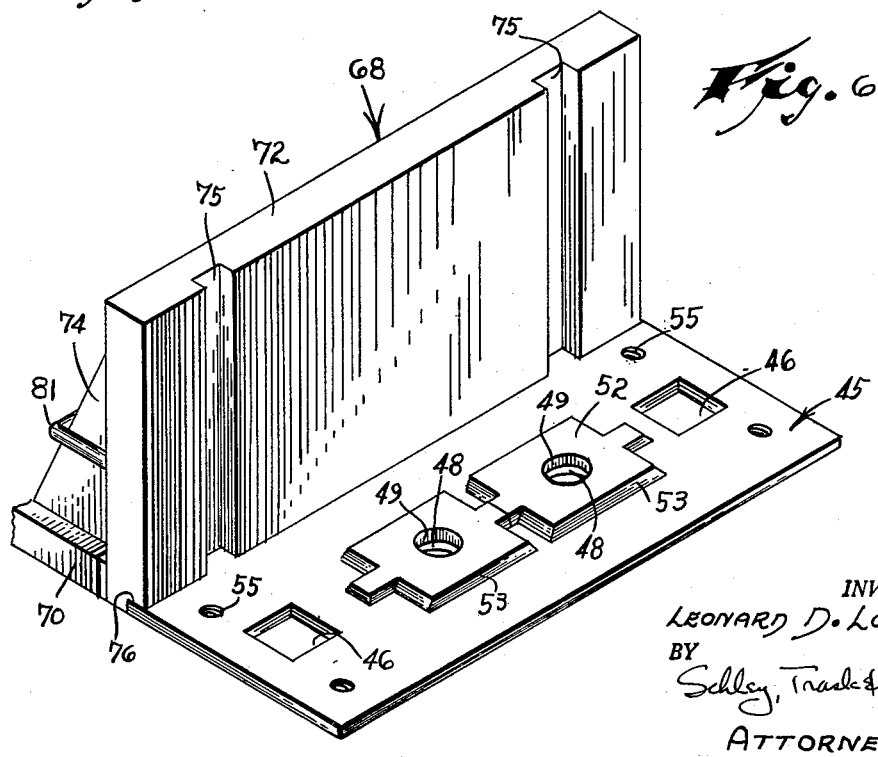
FIG. 6 is an isometric view of the bottom palette and one of the sidewall-forming members.

The worktable 30 is also provided with a longitudinally extending groove 67 intersecting the groove 43 at its midportion. Slidable in the worktable groove 67 is a pair of mold sidewall-forming members 68, each of which comprises a base 70 and a sidewall 72 extending upwardly from the inner edge of said base. The base and sidewall are connected along their abutting edges as by welding and by a plurality of triangularly shaped braces 74 welded to the adjacent faces of the base and sidewall. As shown in FIG. 6, the inner face of each sidewall 72 has a vertically extending keyway 75 adjacent each of its ends, and is recessed, as at 76, along its lower edge so that when the bases 70 of the pair of sidewall-forming members are slid inwardly in the groove 67, the recesses 76 in the sidewalls 72 will be received over the lateral edges of the bottom palette 45. To guide the sliding movements of the sidewall-forming members 68 in the groove 67, and to hold said members in the groove, I provide pairs of guide blocks 78 removably mounted on the worktable 30 adjacent the edges of the groove 67 and extending over the lateral edges of the bases 70. The sidewall-forming members 68 are releasably held in operative position on the bottom palette by keys 79 extending over the rear edges of the bases 70 and receivable in transversely extending keyways 80 formed in the worktable 30. Conveniently, handles 81 may be mounted on the members 68 to facilitate handling said members and sliding them along the worktable groove 67.

Figure 5:
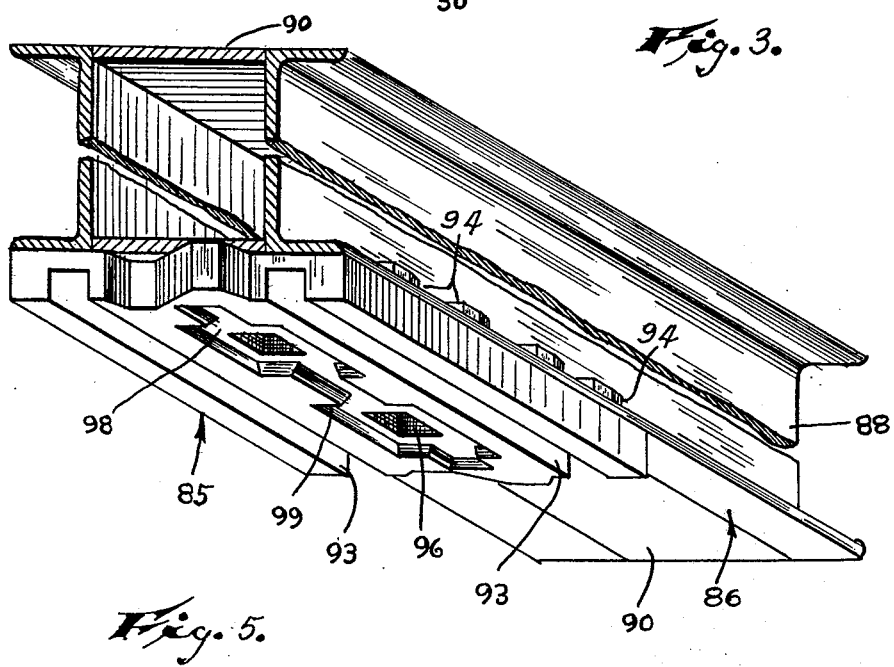
FIG. 5 is a fragmentary isometric view of the top palette and top palette beam.

As shown in FIGS. 5 and 11, the top of the mold is closed by a top palette 85 supported on a transversely extending beam 86 comprising a pair of channels 88 whose webs are presented inwardly. The channels 88 are interconnected and held in spaced relation by a pair of elongated aligned plates 90 welded to the inner faces of the channels 88 at their upper and lower edges. The top palette is mounted on the lower face of the beam 86 as by bolts 94 connecting said top palette to the lower legs of the beam channels 88. The lower face of the top palette 85 is provided with a pair of longitudinally extending grooves 93 adapted to fit over the upper ends of the mold sidewalls 72, and a plurality of openings 96 corresponding to the openings 48 and 49 in the bottom palette 45 and the projections 52 mounted on the bottom palette. Openings are also provided in the beam plates 90 in alignment with the top palette openings 96, the purpose of said openings will become more apparent hereinafter. Conveniently, in order to produce the keys 14 in the top faces of the blocks, the palette openings 96 are bordered by recesses 98 having beveled edges 99, and corresponding to the patterned projections 52 on the bottom palette 45.

As shown in FIGS. 10 and 11, the beam 86 upon which the top palette is mounted extends transversely above the worktable with its ends projecting outwardly from between the pairs of frame members 17 and 18, and 19 and 20. The ends of the channels 88 forming the beam 86 are interconnected at their upper faces by plates 100 similar to the upper plate 90 but spaced therefrom and rigidly secured to the opposed inner faces of said channels. The plates 100 are connected, as by nuts 101, to the lower ends of a pair of rams 102 of a pair of hydraulic cylinders 104 mounted on either side of the supporting frame by brackets 106 secured to frame members 17–20. Thus, the cylinders 104 are adapted to move the beam 86 vertically with respect to the worktable 30 to move the top palette 85 between an operative position in which it is received over the upper ends of the sidewalls 72, and a retracted position in which it is disposed well above said sidewalls.

As shown in FIG. 10, the vertical movements of the beam 86 are guided by pairs of rollers 110 projecting outwardly from the beam 86 adjacent the ends thereof to ride against vertically extending guide blocks 112 mounted on the inwardly presented faces of each of the frame members 17–20. As shown, the rollers 110 are carried in pairs of axle blocks 113 secured to the upper and lower beam plates 90 as by bolts 114 and extending transversely of the beam 86. Each of the axle blocks 113 is provided with an axle 116 projecting outwardly from each of its ends upon which the rollers 110 are rotatably retained, as by cotter pins 117. Thus, the rollers 110 are mounted on the beam 86 in opposed pairs on either side of said beam and adjacent each of its ends to engage the guide blocks 112 and keep the beam 86 in horizontal alignment during its vertical movements by the cylinders 104.

To further insure guided vertical movement of the beam 86 for keeping said beam horizontally aligned during its vertical movements, I mount a pair of pillow blocks 118 on the outer faces of the frame members 17 and 19. Journaled within the blocks 118 is an axle 120 having arms 122 rigidly mounted thereon adjacent each of its ends. As shown in FIG. 11, the axle 120 extends outwardly beyond the extent of the frame members 17 and 19 to dispose the arms 122 outwardly beyond the lateral extent of said frame members. Each of the arms 122 is pivotally connected, as by a pin 124, to the upper ends of a pair of generally downwardly extending links 125 which are pivotally connected at their opposite ends, as by a pin 126, to a rib 128 rigidly connected to the opposed faces of the beam channels 88. During the vertical movements of the beam 86 the arms 122 swing through the extent of the channel members 88 adjacent the frame members 17 and 19, and said channel members are thus notched, as at 129, to permit the unrestricted pivotal movement of the arms 122 during such vertical movement of the beam. Thus, as the beam 86 is moved vertically by the cylinders 104 the rollers 110 riding against the guide blocks 112 act in combination with the synchronizing assembly 118—129 to keep the ends of said beam in horizontal alignment.

Figure 2:
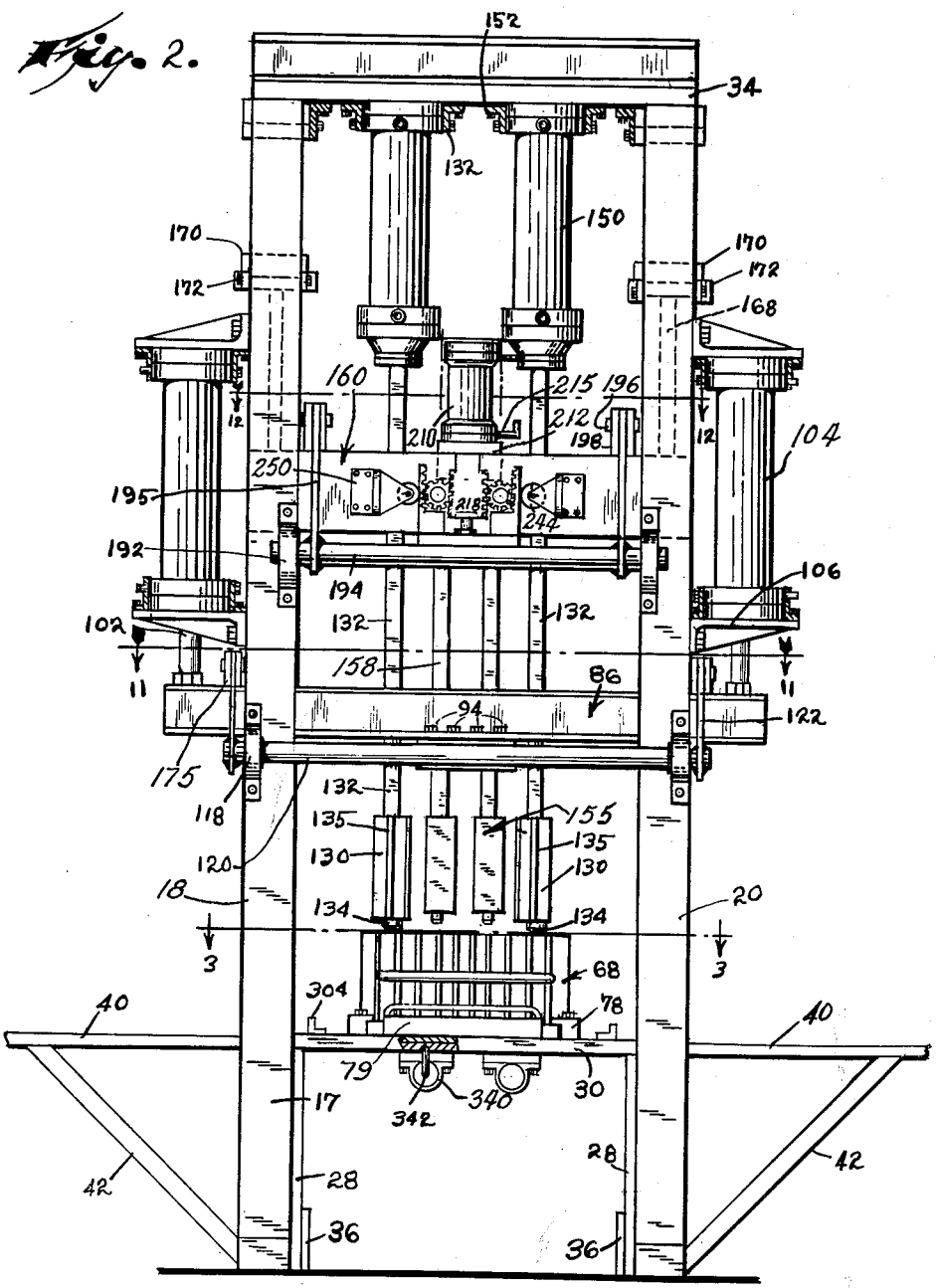
FIG. 2 is an end elevation of the apparatus shown in FIG. 1, but with the aggregate hoppers being removed.

As is shown in FIGS. 2 and 3, the ends of the mold cavity are closed by a pair of end-formers 130 slidably carried on vertically extending shafts 132. The end-formers 130 are vertically movable with the shafts 132 between a retracted position in which they are disposed above the mold cavity adjacent the lower face of the top palette beam 86 and an operative position in which they are seated on the bottom palette 45 adjacent the ends thereof to close the ends of the mold cavity. The shafts 132 are slidable in centrally disposed, vertically extending openings formed in the end-formers and are thus vertically movable with respect to said end-formers. The end-formers are supported on the shafts for vertical movement thereon by pilots 134 formed on the lower ends of the shafts 132 and engageable with the bottom faces of the end-formers, said end-formers being held in engagement with the pilots by gravity. As shown in FIG. 3, the lateral faces of the end-formers 130 are provided with ribs 135 projecting outwardly therefrom for reception in the keyways 75 formed in the sidewalls 72 to guide the vertical movements of the end-formers as they are lowered into operative position between the sidewall-forming members 68. As the shafts 132 are lowered to position the end-formers in operative position, their pilots 134 project through the openings 46 in the bottom palette 45 to permit the lower faces of the end-formers to seat on the upper face of said palette, the shafts 132 extending through the palette openings 46 during any override of the shafts upon movement of the end-formers into operative position. The opposed inner faces of the end-formers 132 are keyed, as at 137, to form the keys 12 and keyways 14 in the end faces of the finished block.

The shafts 132, which constitute the lower ends of a pair of rams actuated by vertically extending hydraulic cylinders 150, extend downwardly from said cylinders through the top palette beam 86 to their respective end-formers 130. As shown in FIG. 2, the cylinders 150 are mounted as by collars 152 to the lower face of the transversely extending frame channels 34 at the top of the supporting frame. The vertical movements of the shafts 132 for raising and lowering the end-formers are of course guided by openings formed in the plates 90 on the top palette beam 86 through which the shafts 132 slide.

The cores 115 in the block are formed by a pair of expandable core-formers 155 carried on pairs of vertically extending shafts 156 and 158. The shafts 156 and 158 extend upwardly through the openings 96 in the top palette 85 for connection to a transversely extending core beam 160 disposed above the palette beam 86, and comprising a pair of parallel spaced beam members 162 interconnected adjacent their ends by pairs of blocks 164 rigidly mounted on the upper faces of said beam members. Each of said blocks is rigidly connected, as by nuts 166, to the lower end of a downwardly extending ram 168 of a hydraulic cylinder 170. As shown in FIG. 1, each of the cylinders 170 is connected to brackets 172 mounted between the opposed pairs of frame elements 17 and 18, and 19 and 20. Thus, upon actuation of the cylinders 170, the core beam 160 will be moved vertically to move the core-formers between an operative position in which they are seated on the projections 52 on the bottom palette and a retracted position in which they are disposed above the mold cavity adjacent the lower face of the top palette 85.

Figure 12:
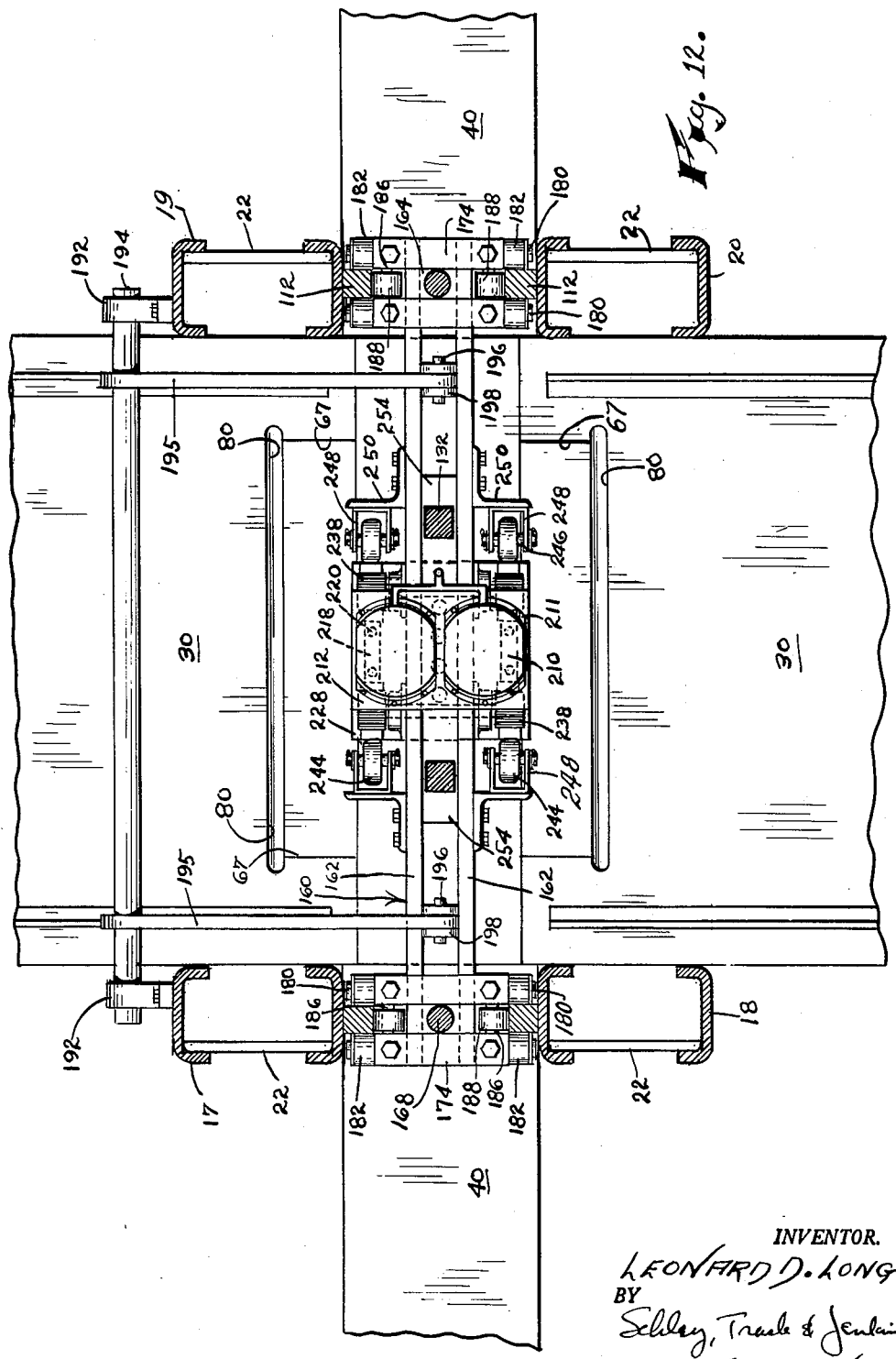
FIG. 12 is a horizontal section taken on the line 12—12 of FIG. 2, but with the mold removed therefrom.

In order to insure the guided vertical movement of the beam 160, I provide a guide assembly at each end of the beam acting in combination with the vertically extending guide blocks 112 mounted on the frame members 17–20. As shown in FIGS. 12 and 13, each of the guide assemblies at the ends of the core beam 160 comprises a pair of spaced axle blocks 174 mounted in spaced relation to each other on the upper face of one of the ram blocks 164 and disposed in alignment with a correspending set of axle blocks 175 mounted in spaced relation to each other on the lower face of a block 176 corresponding to one of the ram blocks 164 and mounted on the lower faces of the beam members 162. Pairs of the axle blocks 174 and 175 are mounted on the blocks 164 and 176 respectively as by bolts 178 with each of said blocks having a pair of outwardly projecting axles 180 normal to the core beam 160. A roller 182 is rotatably carried on each of the axles 180 and may be retained thereon as by cotter pin 184. Spaced inwardly from each of their ends, each pair of the axle blocks is provided with aligned openings for the reception of an axle 186 parallel to the longitudinal axis of the beam 160 and carrying a roller 188. Thus, during vertical movement of the core beam 160, the pairs of rollers 182 will ride against the lateral faces of the guide blocks 112 and the rollers 188 will ride against the inwardly presented faces of said guide blocks to guide the vertical movements of the core beam.

To further insure the guided vertical movement of the core beam 160, I mount a pair of pillow blocks 192 on the outer faces of the frame mebers 17 and 19. Journaled with the blocks 192 is a transversely extending axle 194 having a pair of arms 195 rigidly mounted thereon. As shown in FIGS. 2 and 12, the arms 195 are mounted on the axle 194 inwardly of the frame members 17 and 19 and are pivotally connected, as by pins 196, to pairs of generally downwardly extending links 198. The lower ends of each pair of links 198 is pivotally connected, as by a pin 200, to a rib 202 rigidly secured to the opposed faces of the beam members 162. Thus, as the beam 160 is moved vertically by the cylinders 170, the rollers 182 and 188 riding against the guide blocks 112 act in combination with the synchronizing mechanism 192—202 to keep the ends of said beam in horizontal alignment.

As will be more fully explained hereinafter, in order to expand the core-formers 155 to compress the aggregate in the mold it is necessary to move each of the shafts 158 downwardly, and each of the shafts 156 upwardly. To insure a uniform expansion of the core-formers this relative movement of the shafts 156 and 158 must be synchronized, and the two sets of shafts must be moved the same distances. To this end, I mount the core-former expanding mechanism shown in FIGS. 13 and 14 on the beam 160. As shown, such mechanism comprises a pair of hydraulic cylinders 210 mounted as by collars 211 on a platform 212 extending transversely of the core beam 160 and supported on the upper face thereof. Hydraulic fluid under pressure moves into and out of the cylinders 210 adjacent their upper and lower ends through a pair of T-joint connections 214 and 215. As shown in FIG. 14, the connection 214 is interposed between the top of the cylinders and the upper faces of their piston heads 217, and the connection 215 is interposed between the base of the cylinders and the heads 217. Selective fluid movement of the hydraulic fluid through the connections 214 and 215 is controlled by conventional valve means not shown.

Mounted on the lower face of the platform 212 adjacent the center thereof and slidable between the beam members 162 is a depending block 216 into which the upper ends of the shafts 156 are threadably received. A pair of downwardly extending plates 218 are also mounted on the platform 212 adjacent the edges thereof, as by bolts 220, and carry vertically extending gear racks 222 mounted on their opposed end faces, said plates being disposed adjacent to and parallel with the outer faces of the beam members 162.

The rams 224 of each of the cylinders 210 extend downwardly through the openings in the platform 212 and have their lower ends connected, as by nuts 226, to a transversely extending carrier 228 parallel to the platform 212. As shown in FIG. 14, the upper ends of the shafts 158 are shouldered and threaded, as at 230, to rigidly connect said shafts to the carrier 228. A vertically extending gear rack 232 is mounted on the carrier 228 adjacent each of its corners as by mounting blocks 234 welded to the gear racks and connected to the plate 228 by bolts 236. The adjacent pairs of gear racks 232 and 222 mesh with pinion gears 238 rotatably mounted on the outer faces of the beam members 162 on pillow blocks 240. In order to keep the racks 232 in engagement with the gears 238 and to guide the vertical movements of the carrier 228 and the shafts 158 connected thereto, I provide a plurality of guide rollers 244 each of which is rotatably engageable with one of the racks 232, and carried on an axle 246 mounted in a channeled support 248 supported on one of the beam members 162 by a bracket 250.

Thus, to move the shafts 158 downwardly and the shafts 156 upwardly to expand the core-formers, hydraulic fluid under pressure is forced into the cylinders 210 through the connection 214. Such fluid pressure exerts an upward force on the cylinders 210 and a downward force on the cylinder pistons. The upward force on the cylinders 210 causes said cylinders to move upwardly away from the core beam 160 and carry the platform 212 and thus the shafts 156 in a like direction, as is shown in FIG. 13. Concurrently, the downward force on the piston heads 217 causes the rams 224 to force the carrier 228 downwardly thus moving the shafts 158 in a like direction.

Conversely, to move the shafts 156 downwardly and the shafts 158 upwardly, hydraulic fluid under pressure is introduced into the cylinders 210 through the connection 215 to create a downwardly directed force on the base of the cylinders and an upwardly directed force on the piston heads 217. The connections 214 and 215 are, of course, valved so that fluid movement into the cylinders 210 through one of said connections will effect an exit of the fluid in the opposite end of the cylinder through the other connection.

This relative vertical movement of the platform 212 and the carrier 228 is synchronized by the gear racks 232 and 222 meshing with the gears 238. The vertical movement of the gear racks 232 is of course guided by the rollers 244 mounted on the outer faces of the beam members 162. In order to further guide the upward vertical movement of the cylinders 210 and the platform 212, I mount a pair of guide plates 254 between the beam members 162 in sliding engagement with the ends of the vertically movable block 216. Said guide plates 254 extend outwardly from the edges of the block 216 and are provided with openings in which the end-former shafts 132 are slidable whereby the core beam 160 will guide the vertical movements of said end-former shafts and the end-former shafts will guide the vertical movements of the core beam.

As shown in FIG. 13, when the core-former actuating mechanism is moved into core-former expanding position the platform 212 and the carrier 228 will be disposed out of engagement with the beam 160. In this position, the actuating mechanism is supported from said beam by the gears 238 mounted on the beam 160 and meshing with the teeth on the racks 222 and 232. Thus, the differential gear assembly not only synchronizes the relative movements of the shafts 156 and 158, but also supports the core-former actuating mechanism on the beam 160.

As illustrated, shafts 156 and 158 carry a plurality of core-formers 155 vertically movable, as by movement of the beam 160 by the cylinders 170, between an operative position in which they are disposed between the opposed sidewalls 72 of the mold cavity and a retracted position as shown in FIG. 2 in which they are disposed above said sidewalls and adjacent the lower face of the top palette 85. Each of the core-formers is identical in construction and is illustrated in FIGS. 15–21. The core-formers employed in my apparatus are expanded by a double-wedge arrangement.

Each of the core-formers comprises four generally L-shaped elongated core segments 260 disposed at the corners of the core-former. Each of said core segments has three angularly disposed inner thrust-receiving faces 262 which diverge uniformly inwardly toward the vertical axis of the core-former from the top and the bottom faces of the core segment to give said core segment a thickened medial portion 264.

Slidably carried between the core segments 260 are a pair of opposed upper and lower wedges 266 and 268 respectively for imparting lateral expansion to the core segments and thus the core-former. As shown in FIG. 17, each of the wedges has a generally octagonal cross-section and is provided with eight thrust faces 270 slidably engageable with the thrust-receiving faces 262 on the core segments 260. The thrust faces 270 on the upper wedge 266 taper inwardly from the top toward the bottom thereof and the thrust faces 270 on the lower wedge 268 taper inwardly from the bottom toward the top thereof.

The core segments 260 are held in operative position against the wedges 266 and 268 by means of vertically extending face plates 272 having beveled edges 273. A pair of T-shaped keys 274 are mounted on the vertical axis of the inner face of each of the face plates, and diverge inwardly toward the vertical axis of the core-former. As shown, the keys 274 diverge inwardly from the top and bottom edges of the face plates at the same angle as the slope of the tapered thrust faces on the pair of wedges 266 and 268 and are slidably received in T-shaped keyways 276 formed in the wedge thrust faces 270. In this manner, the face plates 272 are held against the adjacent outer faces of a pair of adjacent core segments 260 to hold said core segments in operative position against the wedges 266 and 268.

As shown in FIGS. 20 and 21, inwardly extending cover plates 278 and 279 are mounted on the upper and lower ends respectively of each of the face plates 272 to overlie the upper and lower ends of a pair of adjacent core segments 260. As with the vertically extending face plates 272, the lateral edges of the cover plates 278 and 279 are beveled as at 280. The lower cover plates 279 support a pilot plate 282 carried between the lower ends of the core segments and the upper faces of said cover plates. The pilot plate 282 has a pilot 284 extending downwardly between the adjacent inner edges of cover plates 279 for reception in the openings 48 and 49 in the bottom palette and palette plates 52 upon lowering of the core-former to guide said core-former into operative position in the mold cavity. The cover plates 278 retain an apertured plate 285 between the lower faces of the plates 278 and the upper faces of the core segments.

The core-former is carried on the pair of vertically extending shafts 156 and 158 by connecting the lower end of the shaft 158 to the wedge 266 and the lower end of the shaft 156 to the lower wedge 268. To this end, the upper face of the wedge 266 is tapped for the reception of the shouldered lower end of the shaft 158. Conveniently, the lower end of the shaft 158 extends through the opening in the plate 285 and is threadably received in the upper end of the wedge 266, said wedge being further secured to the shaft 158 by a set screw 286. The shaft 158 extends upwardly from the core-former through the openings 96 in the top palette 85 and is connected to the carrier 228 in the manner previously described.

The lower wedge 268 is threadably received upon the lower end of the shaft 156 and is retained thereon by a set screw 288. As illustrated, the shaft 156 extends downwardly from the platform 212 through the shaft 158 and the upper wedge 266 for connection to the lower wedge 268.

Thus, upon actuation of the cylinders 210 by hydraulic fluid passing through the T-connection 214, the shafts 158 will be moved downwardly and the shafts 156 will be moved upwardly to cause the wedges 266 and 268 to be moved toward each other. During such relative movement of the wedges, the thrust faces 270 on the upper wedges 266 bear against the upper stretches of the thrust-receiving faces 262 of the core segments, and the thrust faces 270 on the lower wedges 268 bear against the lower stretches of the thrust-receiving faces 262 of the core segments to cause said core segments to be moved laterally outwardly. During such synchronized movement of the wedges toward each other, their thrust faces 270 exert uniform outwardly directed thrust forces against the thrust-receiving faces 262 on the core segments 260 on the oblique and transverse axes of the core-former to effect an expansion thereof. In expanded position, the core segments are disposed in spaced relation to each other, as shown in FIG. 19, with the face plates 272 bridging the spaces between adjacent core segments to prevent the entry of aggregate into the core-formers from the sides thereof. Similarly, the cover plates 278 and 279 act in combination with the plate 285 and the pilot plate 282 to prevent aggregate from entering into the core-formers from the top and bottom thereof.

To collapse the core-former, the hydraulic fluid is forced into the cylinders 210 through the T-connection 215, thereby forcing the cylinders 210 downwardly and the rams 224 upwardly until the platform 212 rests on the upper face of the core beam 160 and the carrier 228 bears against the bottom face of said beam. This relative movement of the cylinders 210 and their rams 224 causes the gear racks 222 and 232 to move in synchronization due to the action of the pinion gears 238. This relative movement of the platform 212 and carrier 228 toward each other causes the shafts 156 to move downwardly and the shafts 158 to move upwardly, thereby moving the upper wedges 266 upwardly and the lower wedges 268 downwardly within the core-formers. During this relative movement of the wedges 266 and 268 away from each other, their T-shaped keyways 276 will bear against the keys 274 to pull the face plates 272 inwardly toward the vertical axes of the core-formers. This inwardly directed movement of the face plates 272 causes said face plates to bear against the outer faces of the core segments 260 to force said core segments into collapsed position shown in FIG. 15 in which their lateral faces are disposed in abutting relationship with the shanks of the T-shaped keys 274. During such collapsing movements, the beveled edges 273 and 280 on the face and cover plates will slide against the outer faces of the core segments 260 and the pilot plates 282 and plates 285 to screed off any aggregate thereon. The core segments 260 are guided and retained in horizontal alignment during such expansion and collapsing movements by a plurality of vertically spaced, horizontally extending guide rods 290 slidable in aligned openings formed in adjacent pairs of the core segments 260 and in the shanks of the T-shaped keys 274 interposed between the adjacent core segments.

After the core-formers are fully collapsed, they may be removed from the mold by first raising the top palette 85, and then actuating the cylinders 170 to raise the core beam 160 upwardly. As said core beam is raised, the shafts 156 and 158 supported therefrom will be raised causing the lower wedges 268 of the core-formers to bear against the thrust-receiving faces of the core segments and the upper wedges 266 in said core-formers to bear against the plates 285 to thus raise said core-formers out of the mold. The frictional drag between the engaging faces of the lower wedges 268 and the core segments will prevent the raising of said wedges from effecting any expansion of the core-formers during their extraction from the mold.

In order to introduce the aggregate into the mold, I provide a pair of hoppers carried on the worktable 30 on either side of the mold-forming components. Each of the hoppers is identical in construction and operation, and comprises a base 300 mounted on rollers 302 for moving the hopper toward and away from the mold-forming components on tracks 304 conveniently formed from lengths of angle iron mounted on the worktable 30. The base 300 has a floor 306 having a lateral extent slightly greater than the length of the sidewall-forming members 72 of the mold, but provided with a recess 307 along its forward or inner edge having a length slightly greater than the length of the sidewall-forming members 72. A pair of forwardly extending abutments 308 are disposed on either side of the recess 307 and are adapted to extend forwardly to the transverse axis of the mold when the hopper is in operative position, as shown in FIG. 4.

Movable on the base floor 306 is a bucket carriage 310 mounted on rollers 312 adapted to ride along tracks 313 on the base floor 306. Adjacent its inner end the carriage 310 is provided with a bucket 314 having a lateral extent substantially equal to the distance between the opposed faces of the end-formers 130, and provided with an inclined rear wall 316 and an open bottom 318 slidable over the top of one of the mold members 72 upon movement of the bucket into an aggregate-dumping position. The forward face 320 of the bucket is disposed in a substantially vertical plane and is provided with a plurality of rectangularly shaped recesses 322 having a size and configuration generally corresponding to that of the collapsed core-formers 155.

In order to insure a complete and rapid fill of the mold cavity, I provide a plurality of tampers in each of the buckets 314, each of said tampers comprising a vertically extending shaft 324 having a plurality of vertically spaced, horizontally extending fingers 325. The upper end of each of the tamper shafts is pivotally connected to one end of a lever 326 extending through a slot cut in the rear wall 316 of the bucket and pivotally supported by a downwardly extending yoke 328 carried on a support rod 330. The opposite ends of the levers are rotatably connected to a crankshaft 331 rotatably carried in suitable pillows 332 on the bucket carriage 310. The crankshaft 330 is driven by a motor 334 mounted on the carriage 310 and connected to the crankshaft by a chain 336 and a pair of sprockets 338 and 339. Thus, as the crankshaft is rotated the pivotally mounted levers 326 impart a vertical movement to the tampers so that the shafts and fingers thereon will force the aggregate out of the bucket into the mold.

Although the tampers on the aggregate buckets 314 produce a substantially uniform fill of the mold, the uniformity of the aggregate fill is enhanced by the provision of agitating means operable against the bottom palette 45. Such agitation may be provided by any conventional type of agitator. As shown, I employ a pair of agitators 340 having hammers 342 adapted to extend upwardly through openings in the worktable 30 for striking the lower face of the bottom palette 45. The action of the agitators 340 against the bottom palette 45 serves in combination with the bucket tampers to settle the aggregate, and thereby provide a uniform fill throughout the extent of the mold. In mounting the agitators 340 on the worktable 30, it is of course necessary to position them away from the openings in the worktable 30 underlying the bottom palette openings so that the shafts carrying the end-formers and the pilots of the core-formers can project through their respective openings in the bottom palette and worktable.

In producing a pre-cast cored block in the apparatus just described, the following sequence may be employed: The bottom palette 45 is slid along the worktable groove 43 until the recesses 65 in its lower face register with the locator pins 53 on the worktable to thus locate the bottom palette in operative position. The sidewall-forming members 68 are then slid inwardly in their groove 67 until the recesses 76 along the lower edge of the sidewalls 72 are received over the lateral edges of the bottom palette 45. With the sidewall-forming members thus positioned, their retainer keys 79 are placed in operative position to releasably lock the mold sidewalls 72 in operative position along the opposed edges of the bottom palette.

With these mold components in operative position, the cylinders 50 are actuated to lower the end-formers 130 into operative position with the end-former pilots 134 being received in the bottom palette openings 46. Such lowering of the end-formers will be guided by the shafts 132 sliding through the openings in the core and top palette beams 160 and 86 respectively and by the laterally projecting ribs 135 of the end-formers sliding along the keyways 75 in the mold sidewalls.

When the end-formers are positioned in the mold, the core beam 160 is lowered to seat the core-formers 155 in operative position on the projections 52 carried on the bottom palette 45. Movement of the core-formers into operative position is accomplished by actuating the pair of hydraulic cylinders 170 which drive the core beam 160 downwardly. This downward movement of the core beam is guided by the rollers 182 and 188 tracking against the guide blocks 112 and by the synchronizing mechanism 192—202. As the core-formers are lowered into the mold they are seated in operative position by their pilots 284 being received in the openings 48 and 49 formed in the bottom palette 45 and the projections 52 mounted thereon.

Aggregate is then added to the mold cavity by moving the pair of aggregate hoppers toward the transverse axis of the mold along the tracks 304 until the abutments 308 on the opposed hoppers are in abutting relationship along the transverse mold axis. The bucket carriages 310 are then moved toward each other until the mold bucket faces 320 are received around the outer core-former shafts 158 to thus dispose the open bottoms 318 of the buckets over the top of the mold cavity. Actuation of the tampers by the motors 334 will thus discharge the aggregate in the buckets 314 into the mold cavity until said cavity is filled to a level at least as high as the upper edges of the sidewalls 72. As the mold cavity is being filled, the agitators 340 also are actuated to cause their hammers 342 to beat against the bottom palette 45 and thereby produce a uniform fill of the aggregate in the mold cavity. Desirably, the aggregate mixture used in forming blocks in my apparatus is sufficiently plastic that it will not exit through the open bottoms of the buckets 314 without actuating the tampers therein. After the mold cavity is filled, the bucket carriages are moved outwardly on the hopper carriages, and the hopper carriages are then moved outwardly away from the mold on their tracks 304.

With the mold thus filled with aggregate, the top palette 85 is lowered into operative position to close the top of the mold. This is accomplished by actuating the hydraulic cylinders 104 to drive the top palette beam 86 downwardly, said beam being guided by the rollers 110 tracking against the guide blocks 112 and by the synchronizing mechanism 118—129.

With the mold completely enclosed and filled with aggregate, the core-formers are expanded laterally outwardly in the manner previously described. Upon such expansion of the core-formers, the aggregate is compressed in the mold against the inner faces of the end-formers 130, the sidewalls 72, the bottom palette 45, the upper palette 85, and the outer faces of the core-formers themselves. This compression of the aggregate removes substantially all of the entrained air therefrom and forms said aggregate into a self-supporting, pre-cast, cored block which may then be removed from the apparatus and placed in a conventional curing room where it may be cured according to standard practices.

Once the core-formers have been completely expanded to compress the aggregate in the mold, they may be immediately collapsed in the manner previously described. After the core-formers are collapsed, the top palette 85 and the core beam 160 are raised to their retracted positions by the cylinders 104 and 170 respectively. As in the case of their lowering, the top palette and core beams are guided by the action of their respective rollers and synchronizing mechanisms. The end-formers 130 are also raised from the mold by actuating the hydraulic cylinders 150.

With these several mold components moved into their retracted positions, the keys 79 are removed from the bases 70 of the sidewall-forming members 68, and said members are slid outwardly in the groove 67 away from the block. The block supported on the bottom palette 45 may then be slid outwardly from the apparatus onto one of the shelves 40 for its subsequent removal to the curing room. At the time the mold components are removed from the block, the aggregate will be self-supporting and will have little or no tendency to expand to its precompressed state. Any expansion that does occur, however, will take place in the cores 15, and will thus not affect the outer dimensions of the block.

The time required to complete the sequence of operation just described for producing a pre-cast cored block is in the order of thirty seconds. My apparatus thus lends itself to the large-scale production of building blocks on a commercially economic scale.

While the apparatus described is adapted to produce a block of about two feet in length and having two vertically extending cores formed therein, it is to be understood that the apparatus is adapted for the production of longer blocks having any desired number of cores formed therein simply by increasing the length of the components forming the top, bottom, and sidewalls of the mold and by employing a larger number of expandable core-formers. Of course, where larger blocks are to be produced, the size of the aggregate bucket 314 will have to be increased to insure a uniform fill of aggregate in the mold cavity.

I claim as my invention:

1. An apparatus for making cored building blocks, comprising a supporting frame having a worktable mounted thereon, a mold carried on said worktable and defining the outer faces of the blocks to be produced, a vertically movable beam comprising a pair of interconnected spaced parallel members supported from said supporting frame and extending longitudinally above said mold, a plurality of expandable core-formers operatively carried on pairs of shafts whereby opposed vertical movement of the shafts in each of said pairs of shafts in one direction will expand the core-formers and reverse opposed vertical movement of the shafts in each of said pairs of shafts will collapse the core-formers, at least one fluid-actuated cylinder mounted on a platform normally disposed on said beam and having a vertically movable ram extending downwardly therefrom and connected to a carrier parallel to said platform, a block mounted on said platform and slidable between said parallel beam members, one of the shafts in each of said pairs of shafts being connected to said block and the other of the shafts in each of said pairs of shafts being connected to said carrier, said cylinder and ram being vertically movable with respect to each other in opposed vertical directions for expanding and collapsing the core-formers and said cylinder and ram being movable with said beam for moving the core-formers into and out of operative positions in the mold, and means mounted on said beam for guiding the vertical movements of said block and carrier.

2. An apparatus for making cored building blocks as set forth in claim 1 in which the guide means guiding the vertical movements of said block comprises a pair of guide plates rigidly interconnectiong the parallel beam members, and said block is slidable in the plane of the beam against the opposed faces of said pair of guide plates.

3. An apparatus for making cored building blocks, comprising a supporting frame having a worktable mounted thereon, a mold carried on said worktable and defining the outer faces of the blocks to be produced, a beam supported from the supporting frame and vertically movable with respect to the mold, a plurality of expandable core-formers operatively carried on pairs of shafts whereby opposed vertical movement of the shafts in each of said pairs of shafts in one direction will expand the core-formers and reverse opposed vertical movement of the shafts in each of said pairs of shafts will collapse said core-formers, at least one fluid-actuated cylinder mounted on a platform normally disposed on said beam, said cylinder having a vertically movable ram connected to a carrier parallel to said platform, one shaft in each of said pairs of shafts being rigidly connected to said platform and the other shaft in each of said pair of shafts being connected to said carrier, said cylinder and ram being vertically movable with respect to each other and said beam to move said platform and carrier vertically with respect to each other to expand and collapse said core-formers and said cylinder and ram being movable with said beam for moving the core-formers into and out of operative positions in the mold, a plurality of gear racks on said platform and carrier meshing with a plurality of gears mounted on said beam for synchronizing the vertical movements of said platform and carrier and maintaining the cylinder in operative position with respect to said beam.

4. An apparatus as set forth in claim 3 in which a pair of said gears are mounted on each side of said beam, each of said gears meshing with a gear rack mounted on said platform and a gear rack mounted on said carrier.

5. An apparatus as set forth in claim 3 in which a plurality of rollers are mounted on said beam to engage the gear racks on said carrier for holding said gear racks in engagement with said gears.

References Cited in the file of this patent

UNITED STATES PATENTS

| | | |
|---|---|---|
| 1,017,876 | Landis | Feb. 10, 1912 |
| 1,127,521 | Rotarius | Feb. 9, 1915 |
| 1,637,708 | Porter | Aug. 2, 1927 |

(Other references on following page)

UNITED STATES PATENTS

| | | |
|---|---|---|
| 1,676,325 | Doll | July 10, 1928 |
| 2,298,006 | George | Oct. 6, 1942 |
| 2,542,874 | Locatelli | Feb. 20, 1951 |
| 2,586,210 | Corwin | Feb. 19, 1952 |
| 2,624,928 | Long | Jan. 13, 1953 |
| 2,653,371 | Kruse | Sept. 29, 1953 |
| 2,855,628 | Lassman | Oct. 14, 1958 |
| 2,859,502 | Brown | Nov. 11, 1958 |
| 2,865,208 | Wacht | Dec. 23, 1958 |
| 2,892,339 | Flower et al. | June 30, 1959 |
| 2,942,319 | Anthony | June 28, 1960 |
| 2,963,762 | Kovach | Dec. 13, 1960 |

FOREIGN PATENTS

| | | |
|---|---|---|
| 639,986 | Great Britain | July 12, 1950 |